Inventors
Robert B. Dunlap
Evald O. Peterson
by [signature]
Attorney

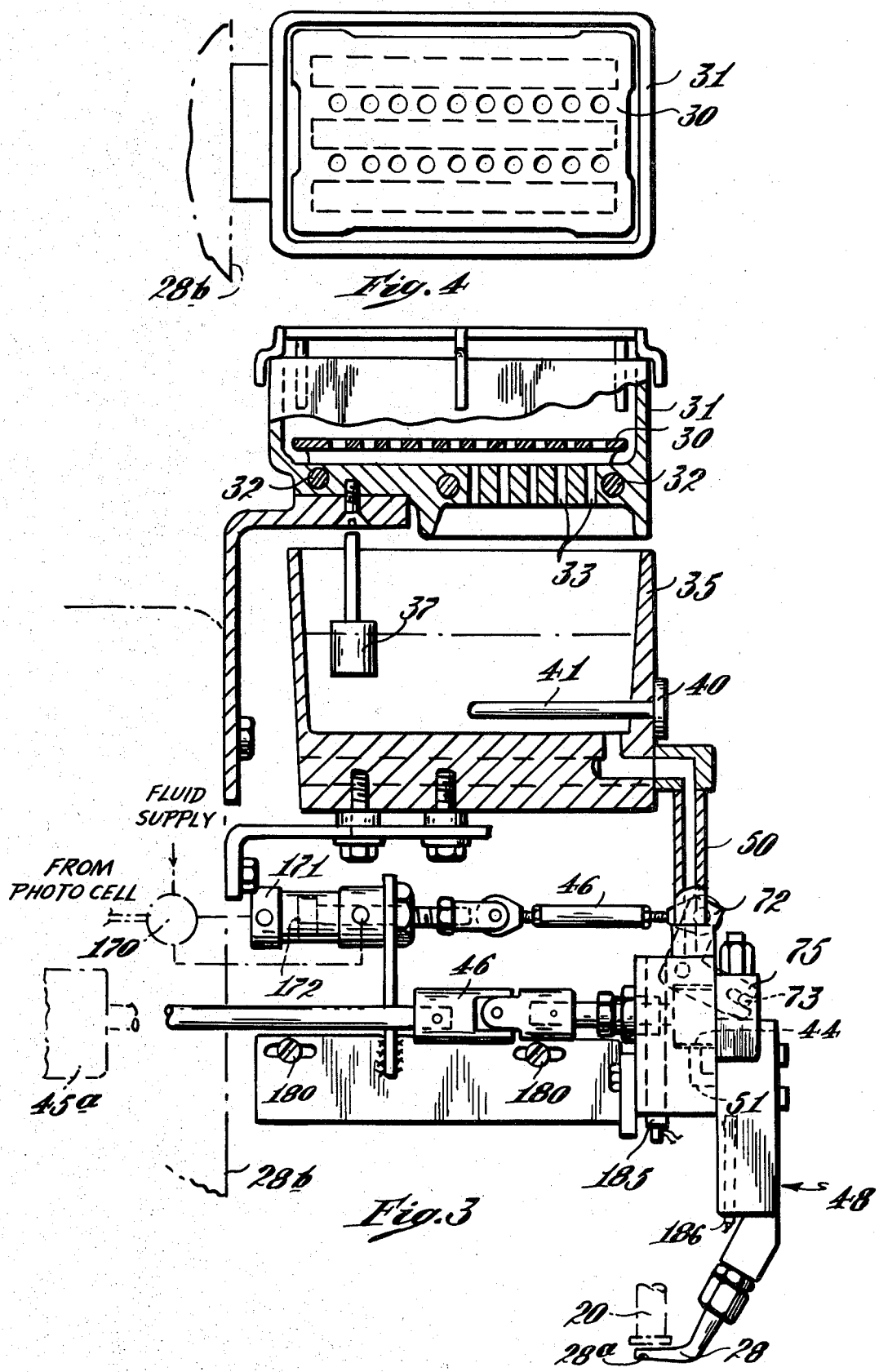

United States Patent Office

3,561,027
Patented Feb. 9, 1971

---

3,561,027
LASTING MACHINE
Robert B. Dunlap, Medway, and Evald O. Peterson, Lynnfield Center, Mass., assignors to Compo Industries, Inc., Waltham, Mass., a corporation of Delaware
Filed Mar. 18, 1969, Ser. No. 808,286
Int. Cl. A43d *31/00*
U.S. Cl. 12—8.3                                16 Claims

ABSTRACT OF THE DISCLOSURE

In a lasting machine of the kind in which a pair of rolls turning in opposite directions apply lasting and feeding stresses to the lasting margin of a shoe, improvements in means for adjusting the spacing between the axes of said rolls, means for controlling the adhesive flow from the adhesive nozzle, the adhesive delivery system, means for adjusting the position of the nozzle relative to the lasting margin, means for adjusting the axis of a rotary wiper at right angles to the axes of said rolls and means for resiliently urging the operative surface of a wiper blade towards the bite of said rolls whereby it is self-adjusting to accommodate different thicknesses of the last margin.

BACKGROUND OF THE INVENTION

The invention relates to lasting machines of the kind in which a pair of feed rolls turning in opposite directions apply lasting and feeding stresses to the lasting margin of a shoe. United States Pat. No. 2,251,284 to Jacob S. Kamborian dated Aug. 5, 1951 discloses such a machine.

Such lasting machines usually include an adhesive application nozzle situated at the delivery side of the feed rolls, means for supplying adhesive to the nozzle, means for controlling the flow of adhesive from the nozzle, means for adjusting the position of the nozzle relative to the lasting margin, a wiper blade which guides the lasting margin downwardly towards the insole as it emerges from the feed rolls and a rotary wiper which forces the margin into final contact with the insole.

However most of these prior art elements have exhibited some disadvantages in practice which the present invention is designed to overcome.

SUMMARY OF THE INVENTION

One object of this invention is to provide an improved lasting machine of the foregoing type which is economical to manufacture, easy to use, easy to adjust by the user, performs an excellent lasting job and is economical in the amount of adhesive which is used.

Another object of this invention is to provide improved apparatus which insures that adhesive will be delivered from the nozzle while the insole and last are in lasting position in the machine and that delivery of adhesive from the nozzle will be terminated when the insole and last are removed from lasting position, thereby preventing waste of adhesive.

A further object is to provide improved means for closing the adhesive delivery passage of the nozzle to prevent dripping of adhesive from the nozzle after the last and insole have been removed from the machine.

Yet another object is to provide improved adhesive control valve means which controls both the opening and the closing of the adhesive delivery passage of the nozzle.

A still further object is to provide improved means for supplying adhesive under pressure to the nozzle.

Another object is to provide improved means for moving the nozzle towards and away from the lasting margin.

A still further object is to provide improved wiper blade means, in which the operative surface of the wiper blade is resiliently urged towards the feed rolls so the wiper blade is self-adjusting to accommodate different thicknesses of the lasting margin.

A further object is to provide improved means for adjusting the rotary wiper towards and away from the axes of the feed rolls so that its spacing from the feed rolls may be adjusted.

Yet another object is to provide improved means for moving the axis of one of the feed rolls towards and away from the axis of the other feed roll thereby to control the pressure exerted upon the lasting margin by their bite.

Other objects and advantages will be apparent to persons skilled in the art from a consideration of the drawings and the following specification and claims.

BRIEF DESCRIPTION OF THE DRAWINGS

FIG. 3 is an enlarged section taken on the line 3—3 of FIG. 1 showing the adhesive heating and delivery mechanism;

FIG. 4 is a plan view of the melting pot shown in FIG. 3;

DETAILED DESCRIPTION OF THE PREFERRED EMBODIMENTS

Figures 1, 2:
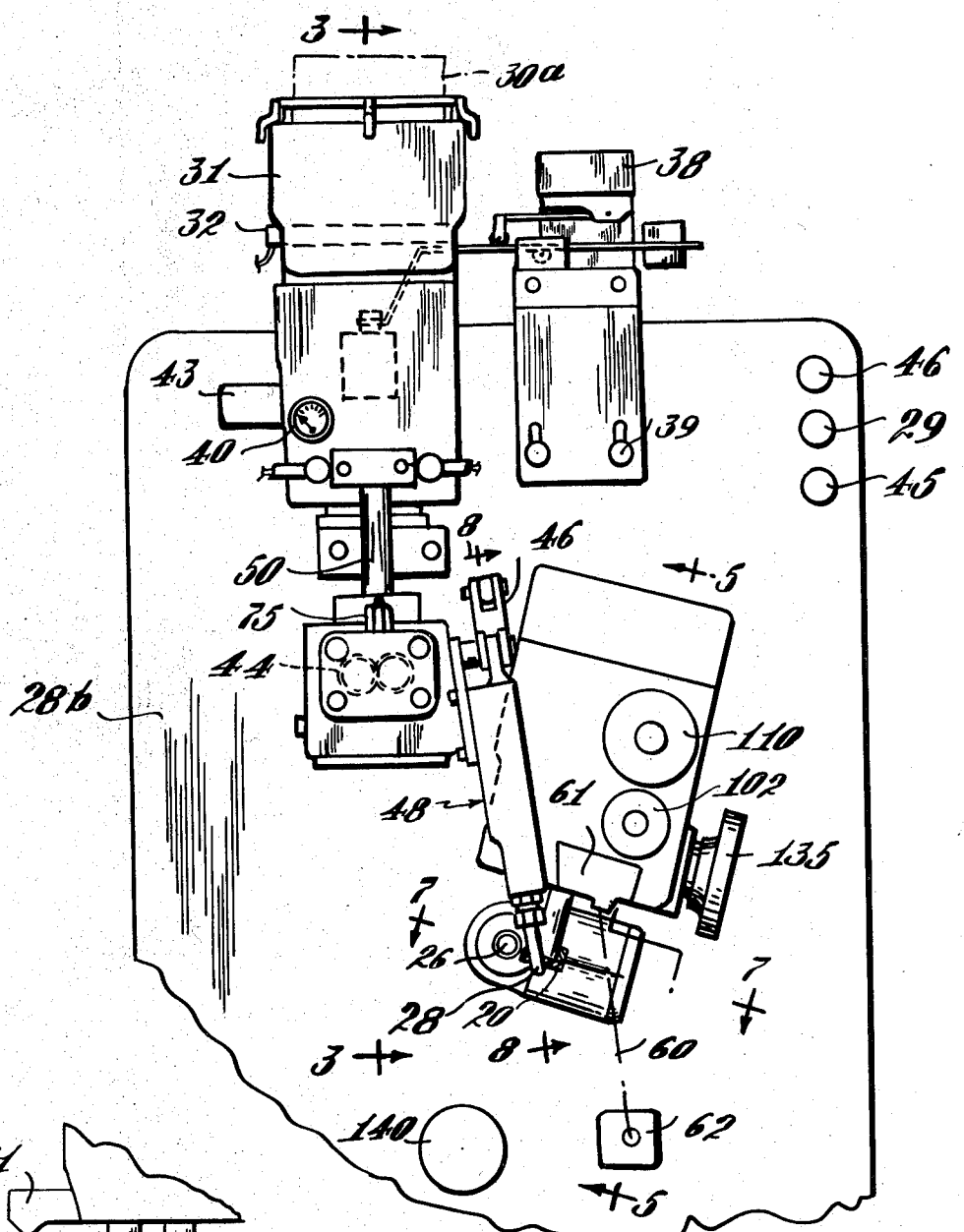
FIG. 1 is a front elevation elevation of a lasting machine embodying the invention.
FIG. 2 is an enlarged side elevation looking from right to left at FIG. 1 showing the photocell and mating light of an electric eye for initiating, maintaining and terminating the delivery of adhesive from the end of the nozzle; a last, insole and lasting margin of a shoe being shown in phantom.
Figure 5:
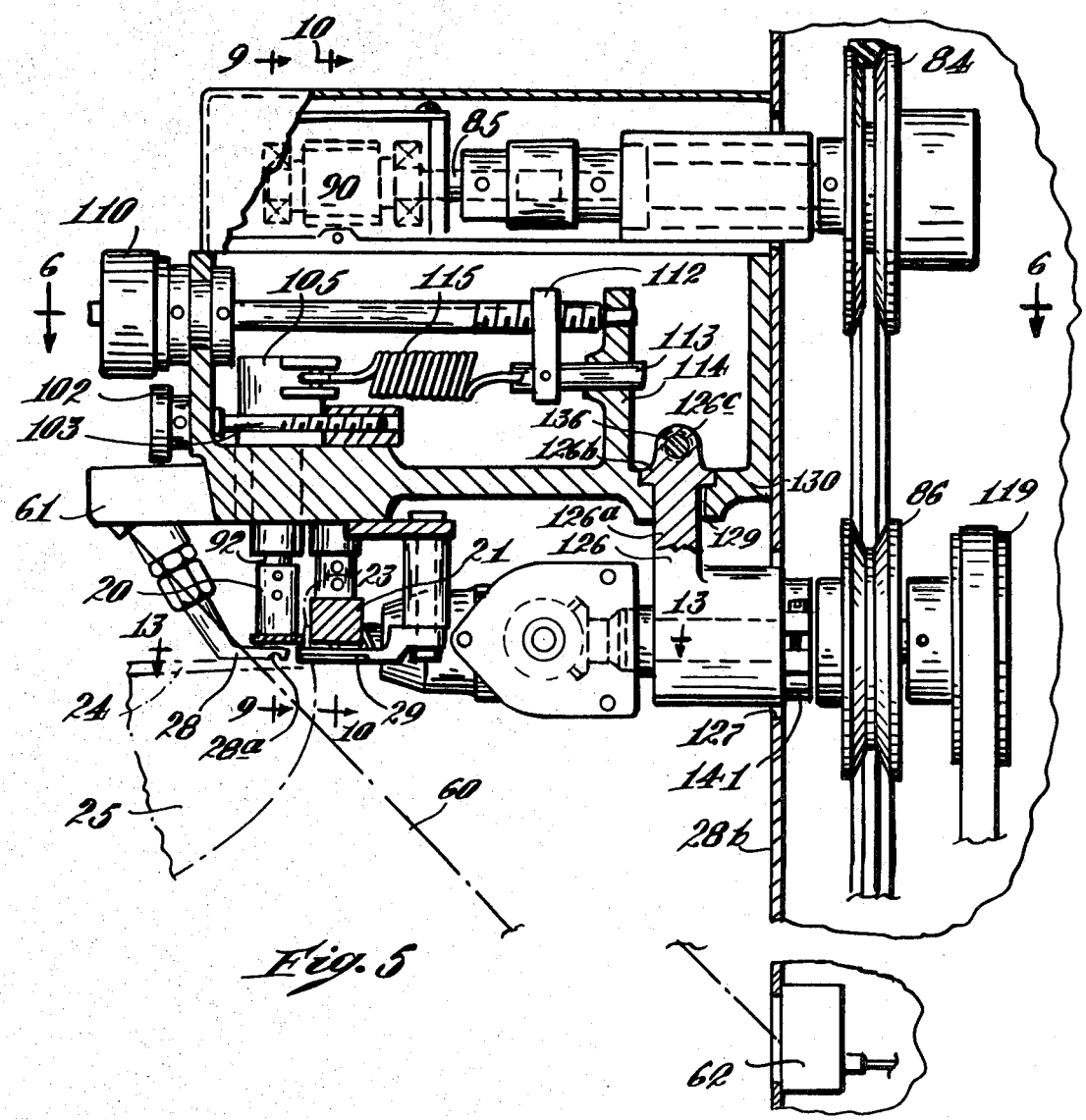
FIG. 5 is an enlarged section taken on the line 5—5 of FIG. 1.
Figure 7:
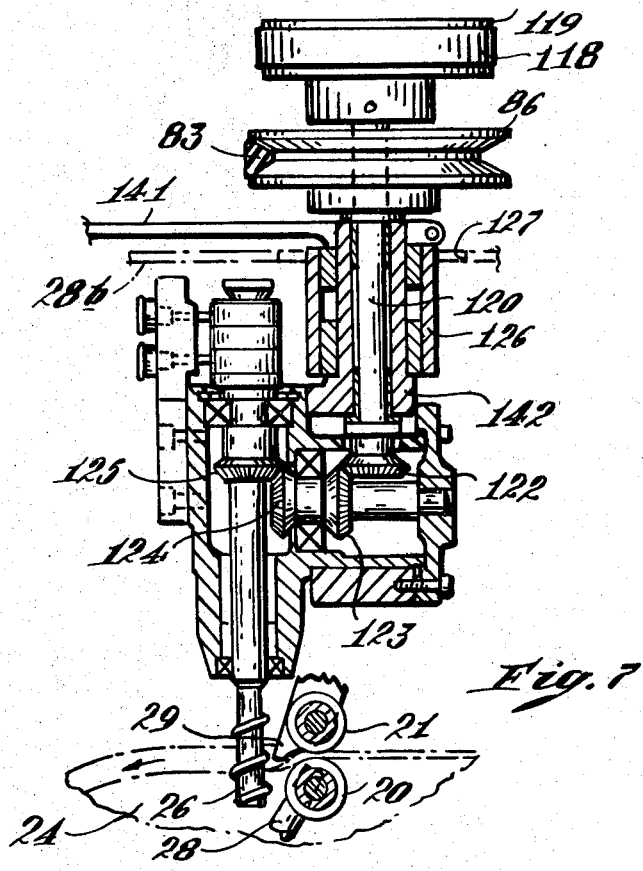
FIG. 7 is an enlarged section taken on the line 7—7 of FIG. 1 showing the feed rolls and rotary wiper with an insole and lasting margin in phantom.

Referring to FIGS. 2, 5 and 7 of the drawings, the front feed roll 20 and rear feed roll 21 are supported for rotation in opposite directions and they engage opposite sides of the lasting margin 23 of an upper which projects upwardly from the insole 24 and last 25. These feed rolls apply both lasting and feeding stresses to the margin thereby pulling the upper snugly about the last and permitting the margin, last and insole to move forwardly from the feed rolls towards the rotary wiper 26 (FIG. 7).

Adhesive is fed from the orifice 28a of the nozzle 28 to the marginal surface of the insole, as best shown in FIGS. 1, 2, 5 and 8.

The wiper blade 29 (FIGS. 5, 7 and 13 and 14) guides the margin downwardly towards the insole as it emerges from the feed rolls. The rotary wiper 26 forces the margin into final contact with the insole.

In practice, the toe and heel of the shoe are usually lasted before the sides of the margin are lasted and the machine is preferably used only to last the sides. However, the machine may be used to last the sides and the toe if the shoe has been previously heel-seat lasted or to last the sides and the heel if the shoe has been previously toe lasted.

THE ADHESIVE MELTING AND FEEDING APPARATUS

While the adhesive may be cold as delivered to the insole, we have shown an apparatus capable of delivering hot adhesive.

Referring to FIGS. 1, 3 and 4 of the drawings, a block of solid adhesive 30a (FIG. 1) is placed on the grid 30 of the melting pot 31 which is heated by means of heating elements 32. These heating elements are initially activated by turning the pre-melt knob 29 located on the front panel 28b of the machine. As the adhesive melts, it flows downwardly through the perforations in the grid, the passages 33 in the bottom of the melting pot and into the reservoir 35.

A float 37 positioned in the reservoir is operatively connected to the switch 38 to cause the switch to open the circuit which is activating the heating elements 32 when the level of the molten adhesive in the reservoir 35 reaches a predetermined level and to cause it to close this circuit when it falls below a predetermined level. As shown in FIG. 1, the height of the switch may be adjusted by the elements 39.

The dial 40 (FIG. 1) indicates the temperature of the adhesive in the reservoir. The element 41 which projects into the reservoir controls the pointer on this dial.

Figure 8:
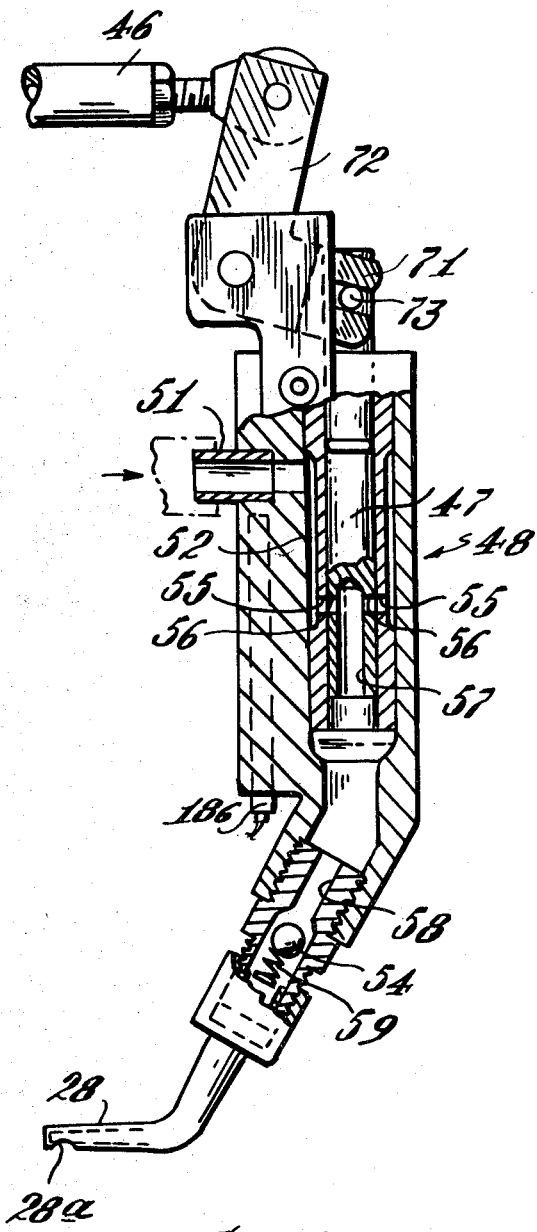
FIG. 8 is an enlarged section taken on the line 8—8 of FIG. 1 showing the adhesive delivery valve and the nozzle.

Thermostatic control switch 43 (FIG. 1) is in the line which supplies current to the motor 45a (FIG. 3) which drives the gear pump 44 and to the means for actuating the valve 170 which controls the supply of fluid to the cylinder 171 and piston 172 (FIG. 3) which reciprocates the plunger 47 of the adhesive control valve 48 (FIG. 8). The switch 43 does not close until the adhesive in the reservoir 35 has reached a predetermined temperature.

When the adhesive has reached the predetermined operative temperature and the switch 43 has closed, the operator turns the control knob 45 (FIG. 1) to close the circuits to the motor 45a and to the means for actuating the fluid supply valve 170.

The adhesive may also be melted directly in the reservoir 35 in block form without providing the melting pot 31. The float control 37 may then also be omitted.

Referring to FIGS. 3 and 8, when the gear pump 44 is operating, it draws molten adhesive from the reservoir 35 through the heated flexible conduit 50 into the chamber of the pump and forces it through the heated conduit 51 and into the valve chamber 52 which is located in the housing of the adhesive valve 48. As shown in FIG. 8, the plunger 47 of the valve 48 is at the lower extremity of its stroke and the ball check valve 54 is open permitting adhesive to flow from the chamber 52 through the passages 55, 56, 57, 58 and 59 to the nozzle and thence through the orifice 28a to the marginal surface of the insole.

The conduit 50 is made of flexible stainless steel and it is heated by a wire (not shown) which is wound about it. The gear pump housing is heated by element 185 (FIG. 3) and the valve 48 and nozzle 28 are heated by the element 186 (FIGS. 3 and 8). Consequently, the adhesive remains melted at all times.

By loosening the screws 180 (FIG. 3) the gear pump 44, valve 48 and nozzle can be moved laterally as a unit to adjust the position of nozzle orifice 28a relative to the insole and the lasting margin.

During the lasting process, the last and insole are in the position shown in FIGS. 2 and 5 or in a corresponding position where the insole interrupts the electric eye beam 60 which otherwise would extend from the light 61 to the photocell 62. When the beam of the electric eye is thus interrupted, the electric eye closes a circuit to a switch (not shown) which closes a circuit causing the valve 170 to be actuated to admit fluid to the cylinder 171. At that time, the plunger 47 is in its elevated position wherein the passages 56 do not register with the passages 55 of the valve 48. However, as soon as said circuit is closed, fluid is admitted to the adjacent end of the cylinder 171 and the double acting piston 172 is moved from left to right looking at FIG. 3. This causes the linkage 46 to be moved from left to right looking at FIGS. 3 and 8 and the cleft end 71 of the pivoted link 72 operating on the pin 73 of the valve plunger 47 moves this plunger downwardly to the position shown in FIG. 8 so that the passages 56 register with the passages 55. During the initial part of this downward movement, the plunger forces the charge of adhesive which remained in the passages 57, 58 and 59 after the previous cycle downwardly, thereby unseating the check valve 54 and forcing this charge of adhesive to and through the orifice of the nozzle.

Interruption of the beam of the electric eye also causes a switch (not shown) to close the circuit to the motor 45a for the gear pump 44 which then commences to force molten adhesive through heated passage 51. As soon as the passages 56 register with the passages 55, this molten adhesive is forced by the pump through the passages 57, 58 and 59 into the nozzle and outwardly thereof to the insole.

As soon as the lasting of one side of the margin has been completed, the last, insole and upper assembly are removed from the machine and interruption of the electric eye beam is terminated. The electric eye then opens the switch to the motor for the gear pump and it ceases to function. The electric eye also causes the switch which controls the valve 170 to move to a position in which the supply of fluid to the adjacent end of cylinder 171 is shut off, and fluid under pressure is supplied to the other end of the cylinder. This causes the piston 172 to be moved from right to left looking at FIGS. 3 and 8 and the plunger 47 is elevated from the position shown in FIG. 8 to its uppermost position. When the plunger is moved upwardly, a vacuum is created in the bore of the valve 48, check valve 54 is closed and dripping of adhesive from the nozzle is prevented.

Relief valve 75 (FIG. 3) relieves the pressure on the adhesive if the electric eye or the switch 163 fail to stop the gear pump or to operate the valve 170.

OPERATION OF THE WIPER BLADE

The wiper blade 29 shown in FIGS. 5, 7, 13 and 14 is located below the end of the rear feed roll 21 and its outer end is between the feed rolls 20 and 21 and the rotary wiper 26. It is supported for rotary movement on the shaft 150.

The spring 153 permits the blade 29 to yield and move clockwise about shaft 150 (looking at FIG. 13) when the lasting margin is introduced. It also permits the wiper blade to yield to any differences in thickness of the lasting margin.

The initial or maximum counterclockwise position of the blade is controlled by engagement of the head of the limit screw 156 with the member 158. The threaded end of screw 156 is received in an interiorly threaded passage in rod 159 the upper end of which is secured to arm 154 by pin 152. Consequently the space between the head of screw 156 and member 158 may be adjusted.

The amount of clockwise movement of the wiper blade is limited by engagement of the lower end of the screw 151 with member 158. The screw 151 secured by the lock nut 155 may be adjusted to control the point at which such clockwise movement will be limited.

ALTERNATE EMBODIMENT FOR CONTROLLING THE INITIATION AND TERMINATION OF THE FLOW OF ADHESIVE

This embodiment may be used instead of the electric eye shown in FIGS. 1 and 2.

Figure 13:
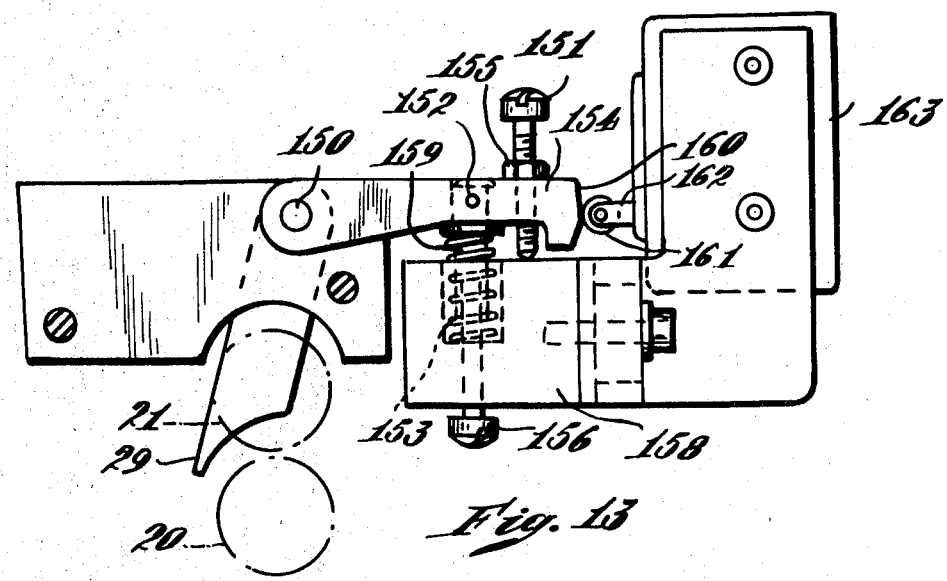
FIG. 13 is an enlarged section taken on the line 13—13 of FIG. 5 showing the wiper blade and a modified arrangement for initiating, maintaining and terminating the delivery of adhesive from the end of the nozzle.
Figure 14:
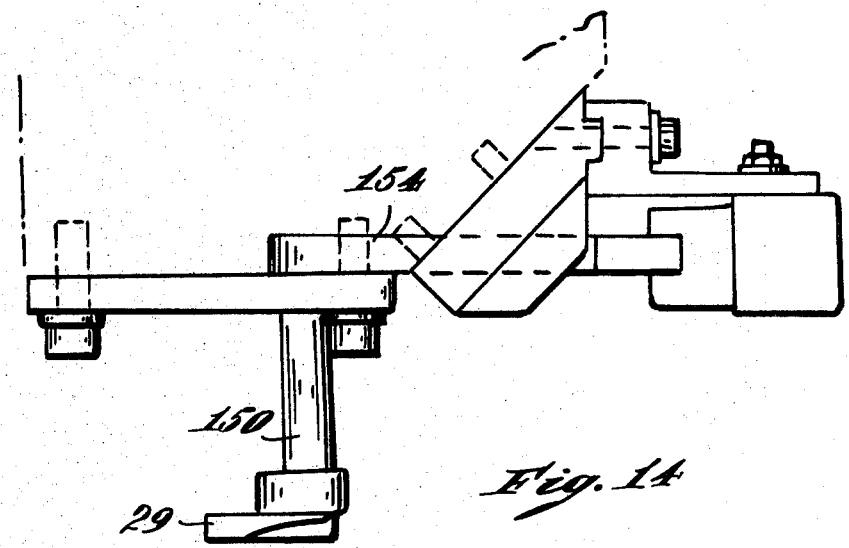
FIG. 14 is a side elevation of FIG. 13.

The free end of the arm 154 constitutes a cam surface 160, FIGS. 13 and 14. The follower roller 161 attached to bifurcated arm 162 engages this cam surface. Arm 162 is connected to switch 163 which controls operation of the motor 45a for the gear pump and the operation of the valve 170 for the fluid supply to the cylinder 171.

When the lasting margin of the upper first engages the wiper blade 29, it moves the blade clockwise looking at FIG. 13 and the vertical part of the cam surface 160 moves the roller 161 and arm 162 from left to right looking at FIG. 13. This movement closes the switch 163 which causes the valve 170 to supply fluid to move the piston 172 in a direction whereby the linkage 46 moves the plunger 47 of the adhesive valve 48 downwardly, thereby opening the check valve 54 and adhesive is ejected from the orifice 28a of nozzle 28. When the margin has been lasted and removed, the spring 153 causes the wiper blade to be moved counter-clockwise and the inclined part of the cam surface 160 engages the roller so that the roller and arm 162 move from right to left looking at FIG. 13, the switch 163 is opened and this causes the valve 170 to be moved to a position in which fluid is supplied to the other end of the cylinder, piston 172 and linkage 46 are moved from right to left looking at FIGS. 3 and 8 and this causes the plunger 47 to be moved upwardly closing the check valve 54 and terminating the flow of adhesive from the nozzle.

The cam surface 160, roller 161 and switch 163 also cause the operation of the gear pump to be started when the lasting margin first engages the wiper blade and to be stopped when the lasting of the margin has been completed and the wiper blade has been returned to the position in which the head of limit screw 156 engages member 158.

Consequently, each of the embodiments of the apparatus disclosed herein insures that adhesive will be delivered from the nozzle while the insole and last are in lasting position in the machine and that delivery of adhesive from the nozzle will be terminated when the insole and last are removed from lasting position, thereby both preventing the waste of adhesive and insuring that adhesive will be delivered to the marginal surface of the insole throughout the lasting step.

THE MEANS FOR OPERATING AND CONTROLLING THE FEED ROLLS

Figure 11:
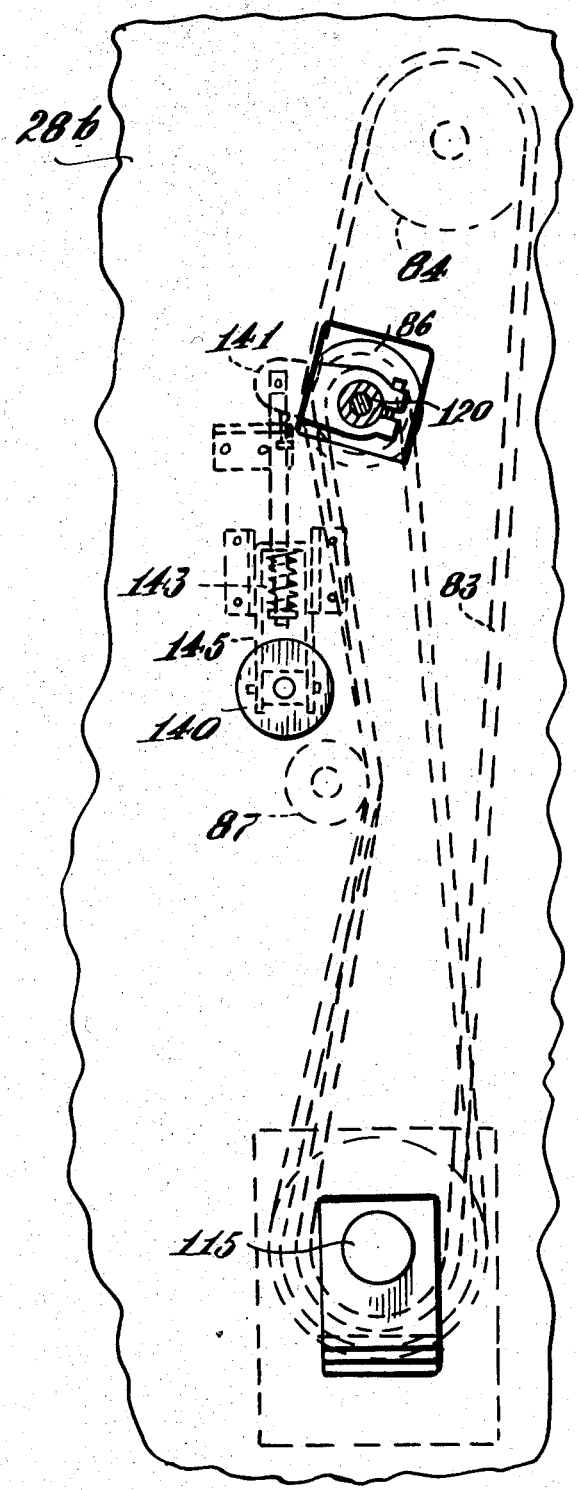
FIG. 11 is a partial front elevation showing the motor, drive pulleys and belts.
Figure 12:
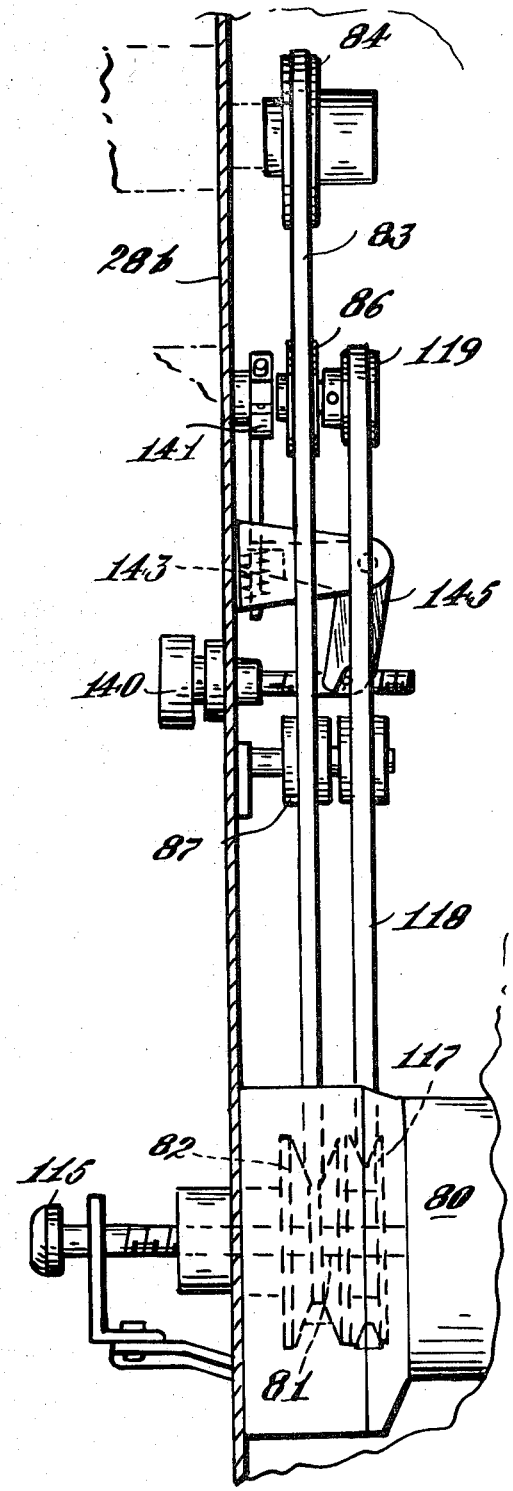
FIG. 12 is a section taken on the lines 12—12 of FIG. 11.

When the operator turns the control knob 46 (FIG 1), this closes a circuit to the motor 80 (FIG. 11) which rotates the shaft 81. The pulley 82 on this shaft through belt 83 and pulley 84 drives the main shaft 85 (FIGS. 11 and 12). Belt 83 engages idler pulleys 86 and 87.

Figure 6:
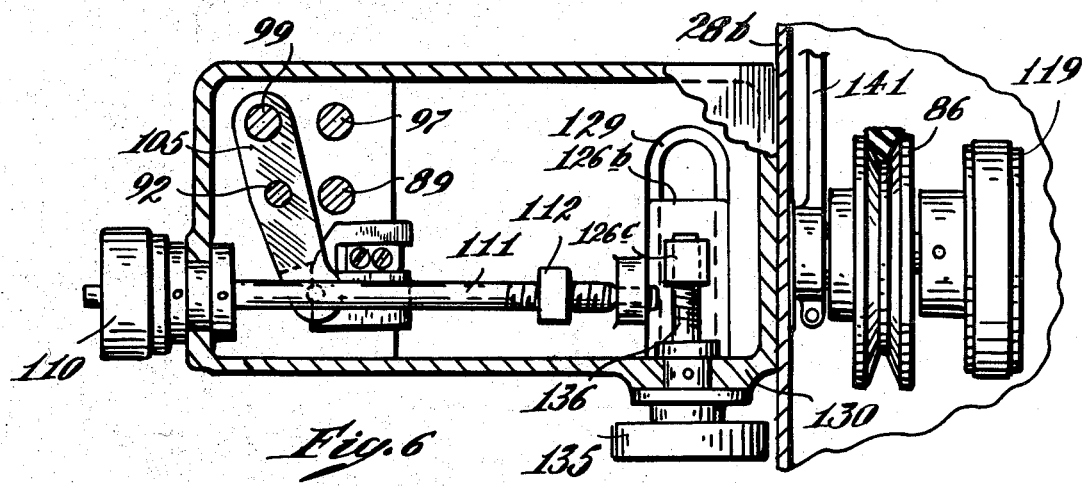
FIG. 6 is a section taken on the line 6—6 of FIG. 5.
Figure 9:
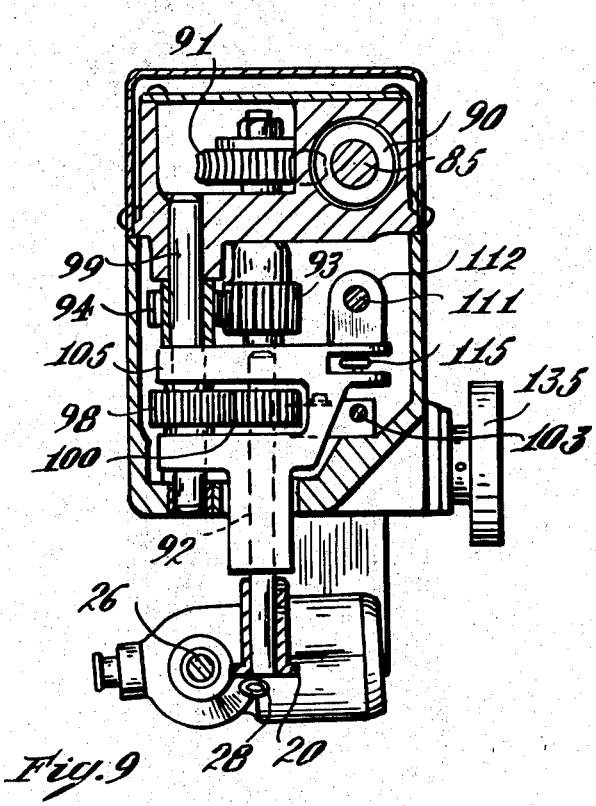
FIG. 9 is an enlarged section taken on the line 9—9 of FIG. 5 showing the means for driving the front feed roll.
Figure 10:
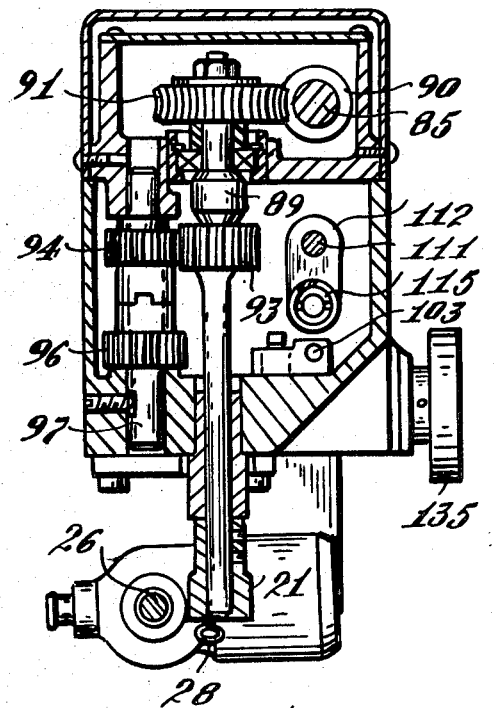
FIG. 10 is an enlarged section taken on the line 10—10 of FIG. 5 showing the means for driving the rear feed roll.

Referring to FIGS. 6, 9 and 10, the rear feed roll 21 is driven by main drive shaft 85 which has attached to it gear 90 which drives gear 91 (FIG. 10) which is attached to shaft 89 to which rear feed roll 21 is attached. Also on shaft 89 is gear 93 which drives gear 94 on shaft 97. Gear 96 is also driven by gear 93 because it is on the same shaft as gear 94. Gear 96 drives gear 98 on shaft 99. Gear 98 drives gear 100 on shaft 92 and shaft 92 drives the front feed roll 20.

Referring to FIGS. 5 and 6, the spacing between the feed rolls can be adjusted by turning the knob 102 which is fixed to the threaded shaft 103. The shaft 92 passes through arm 105 which is pivotally supported on the shaft 99 (FIGS. 6 and 9). The threaded shaft 103 (FIG. 5) is operatively connected to the lower end of the arm 105 and by turning knob 102, the front feed roll can be moved towards and away from the rear feed roll.

The tension of the feed rolls can also be adjusted by the knob 110. This knob is fixed to the shaft 111, the threaded portion of which passes through the lug 112 which is attached to the rod 113, rod 113 being mounted for sliding movement in a passage in frame member 114. The tension spring 115 has one end attached to the rod 113 and its other end attached to the arm 105. Consequently, by turning the knob 110, the amount of force exerted by the spring tending to rotate the arm 105 about the shaft 99 can be varied thus varying the pressure exerted by the front feed roll 20 against the lasting margin which is passing between the feed rolls.

For example, if the margin is of sleazy material which tears easily, the pressure of the front feed roll against the rear feed roll is reduced whereas with a tougher material, the pressure is increased.

The speed of rotation of the feed rolls can be adjusted by manipulation of the knob 115 (FIG. 12). This adjusts the pulley 82 longitudinally of the driven shaft 81 to increase or decrease the pitch diameter of belt 83 running in the pulley thereby changing the speed of the belt which is driving pulley 84.

MEANS FOR OPERATING AND CONTROLLING THE ROTARY WIPER

Referring to FIGS. 7, 11, and 12, the rotary wiper 26 is driven by the pulley 117, belt 118, pulley 119 and shaft 120 to which pulley 119 is secured. As shown in FIG. 7, the shaft of the rotary wiper 26 is driven by shaft 120 through gears 122, 123, 124 and 125.

As shown in FIGS. 5, 6 and 7, the support 126 for the bearing for the shaft 120 passes through an enlarged opening 127 in the front panel 28b and its upwardly extending arm 126a is provided with an element 126b which is slidable in a groove 129 in the frame member 130. Wiper adjustment knob 135 (FIG. 6) is secured to a shaft 136, the threaded end of which extends into an interiorly threaded passage in the upwardly extending lug 126c of element 126a. Thus by rotation of the knob 135, the support 126 is moved longitudinally of the groove 129 and because the shaft 120 and the rotary wiper are supported by 126, the rotary wiper is moved at right angles to the axes of the feed rolls. This is an important adjustment since the spacing of the rotary wiper from the feed rolls must be adjusted depending upon the characteristics of the uppers of the shoes which are being lasted.

The pressure of the rotary wiper against the margin of the upper can also be adjusted by the knob 140, FIGS. 1, 11 and 12. Referring to FIGS. 7, 11 and 12, the upper end of the arm 141 is attached to the sleeve 142 which surrounds the wiper drive shaft 120. The spring 143 controls the vertical position of the sleeve 142 and thereby controls the downward pressure exerted by the rotary wiper against the lasting margin of the shoe. The bell crank 145 has an upper portion which engages the upper end of this spring and by rotating the knob 140, the force exerted by the spring against the washer near the lower end of the arm 141 may be adjusted thereby adjusting the downward force exerted by the rotary wiper against the lasting margin.

While certain desirable embodiments have been described in detail, it is to be understood that the present disclosure is for the purpose of illustration only and that this invention includes all modifications and equivalents which fall within the scope of the appended claims.

We claim:

1. In a lasting machine of the kind in which a pair of rolls turning in opposite directions apply lasting and feeding stresses to the last margin of a shoe, an adhesive applicator nozzle situated at the delivery side of the rolls, operable means for supplying adhesive under pressure to said nozzle, and means for controlling the operation of said operable means, comprising wiper means including a wiper blade engageable by the lasting margin as it emerges from the bite of said rolls, whereby the margin is guided towards the insole, said wiper means including resilient means for urging the operative surface of the wiper blade towards the bite of the rolls, said surface of the wiper blade being moved away from said bite against the pressure of said resilient means by engagement of the lasting margin with said surface and returned to its initial position by the resilient means when said engagement thereof by the lasting margin ceases, and means responsive to said movements of the wiper blade to cause said operable means to supply adhesive under pressure to said nozzle while said surface of the blade remains in a position away from its said initial position.

2. The combination of claim 1 wherein said wiper means comprises stop means engageable with a stationary member to limit movement of the operative surface of the wiper blade towards the bite of said rolls.

3. The combination of claim 1 wherein said wiper means comprises stop means engageable with a stationary member to limit movement of the operative surface of the wiper blade away from the bite of said rolls.

4. The combination of claim 1 wherein said means responsive to said movements of the wiper blade comprises cam and follower means which are movable responsive to said movements of the wiper blade to initiate, maintain and terminate the operation of said operable means.

5. The combination of claim 4 wherein said means responsive to movements of the wiper blade comprises an arm of the wiper means having a cam surface and a switch which includes a follower roll and means for urging said roll into engagement with said cam surface.

6. The combination of claim 1 wherein said means for supplying adhesive under pressure to said nozzle comprises gear pump means.

7. The combination of claim 1 wherein said means for supplying adhesive under pressure to said nozzle comprises adhesive control valve means, a plunger reciprocable in a passage of said valve means and means for reciprocating the plunger in said passage the operation of which is controlled by said means for controlling the operation of said operable means.

8. In a lasting machine of the kind in which a pair of rolls turning in opposite directions apply lasting and feeding stresses to the lasting margin of a shoe, a rotary wiper for forcing the lasting margin into final contact with the insole, said rotary wiper being supported for rotation about an axis which extends in a direction substantially at right angles to the axes of said rolls and means for moving said rotary wiper towards and away from the axes of said rolls whereby the equidistant spacing of the rotary wiper from the feed rolls may be adjusted.

9. The combination of claim 8 wherein said rotary wiper is supported for rotation in a housing and said means for moving the rotary wiper comprises means for moving said housing laterally relative to the support for said rolls.

10. The combination of claim 9 wherein said housing comprises an arm which is supported by the support for said rolls and said means for moving the rotary wiper comprises means for moving said arm laterally relative to said support for said rolls.

11. The combination of claim 10 wherein said means for moving the rotary wiper comprises an exteriorly threaded adjustment screw engageable with an interiorly threaded portion of said arm.

12. The combination of claim 10 wherein said support for said rolls comprises a groove which extends in a direction at right angles to the axes of said rolls, and said arm comprises means slidable longitudinally of said groove.

13. The combination of claim 12 wherein said means for moving said arm laterally comprises an exteriorly threaded adjustment screw engageable with an interiorly threaded portion of said arm for moving said slidable means longitudinally of said groove.

14. In a lasting machine of the kind in which a pair of rolls turning in opposite directions apply lasting and feeding stresses to the lasting margin of a shoe, the improvement comprising means for supporting one of said rolls permitting movement of its axis towards and away from the axis of the other of said rolls, means for moving said supporting means, said supporting means comprising an arm having one end mounted for swinging movement about an axis which is substantially parallel to the axis of said one roll.

15. The combination of claim 14 wherein the shaft of said one roll is supported by said arm at a locality which is spaced from said axis of swinging movement.

16. The combination of claim 14 wherein the means for moving said supporting means comprises a screw supported by a frame member having its threaded end engageable with said arm for causing said arm to swing about said axis which is parallel to the axis of said one roll.

References Cited

UNITED STATES PATENTS

| | | | |
|---|---|---|---|
| 2,438,917 | 4/1948 | Kamborian | 12—8.3 |
| 2,873,461 | 2/1959 | Kamborian | 12—8.3 |
| 2,915,763 | 12/1959 | Weisz | 12—8.3 |
| 2,970,330 | 2/1961 | Kamborian | 12—8.3 |
| 2,978,717 | 4/1961 | Kamborian | 12—8.3 |
| 3,006,004 | 10/1961 | Rrue | 12—8.3X |

PATRICK D. LAWSON, Primary Examiner